US012605636B2

(12) United States Patent
    Gordon

(10) Patent No.:    US 12,605,636 B2
(45) Date of Patent:        Apr. 21, 2026

(54) AWARENESS-BASED NON-PLAYER CHARACTER DECISION TECHNIQUES

(71) Applicant: Electronic Arts Inc., Redwood City, CA (US)

(72) Inventor: William Arthur Gordon, Apopka, FL (US)

( * ) Notice: Subject to any disclaimer, the term of this patent is extended or adjusted under 35 U.S.C. 154(b) by 243 days.

(21) Appl. No.: 18/506,591

(22) Filed: Nov. 10, 2023

(65) Prior Publication Data

US 2025/0153052 A1     May 15, 2025

(51) Int. Cl.
    *A63F 13/67*          (2014.01)
    *A63F 13/812*         (2014.01)
(52) U.S. Cl.
    CPC ............ *A63F 13/67* (2014.09); *A63F 13/812* (2014.09); *A63F 2300/5553* (2013.01)

(58) Field of Classification Search
    CPC ........ A63F 13/67; A63F 13/812; A63F 13/56; A63F 2300/5553
    See application file for complete search history.

(56) References Cited

U.S. PATENT DOCUMENTS

2009/0247300 A1* 10/2009 Suzuki .................... A63F 13/58
                                                    463/43

* cited by examiner

*Primary Examiner* — Thomas H Henry
(74) *Attorney, Agent, or Firm* — Lee & Hayes, P.C.

(57)                    ABSTRACT

A gaming system may provide for interactable environment geometry (IEG) detection. The gaming system may determine a sensory perspective of a sense of a non-player character (NPC) in a virtual environment of a game simulation, generate perception data of the NPC from the sensory perspective of the sense, input the perception data of the NPC into a detection model associated with the sense and receive, from the detection model, detection data for a detected item. The gaming system may then generate an awareness-based character decision for the NPC based on the detection data of the detected item.

20 Claims, 10 Drawing Sheets

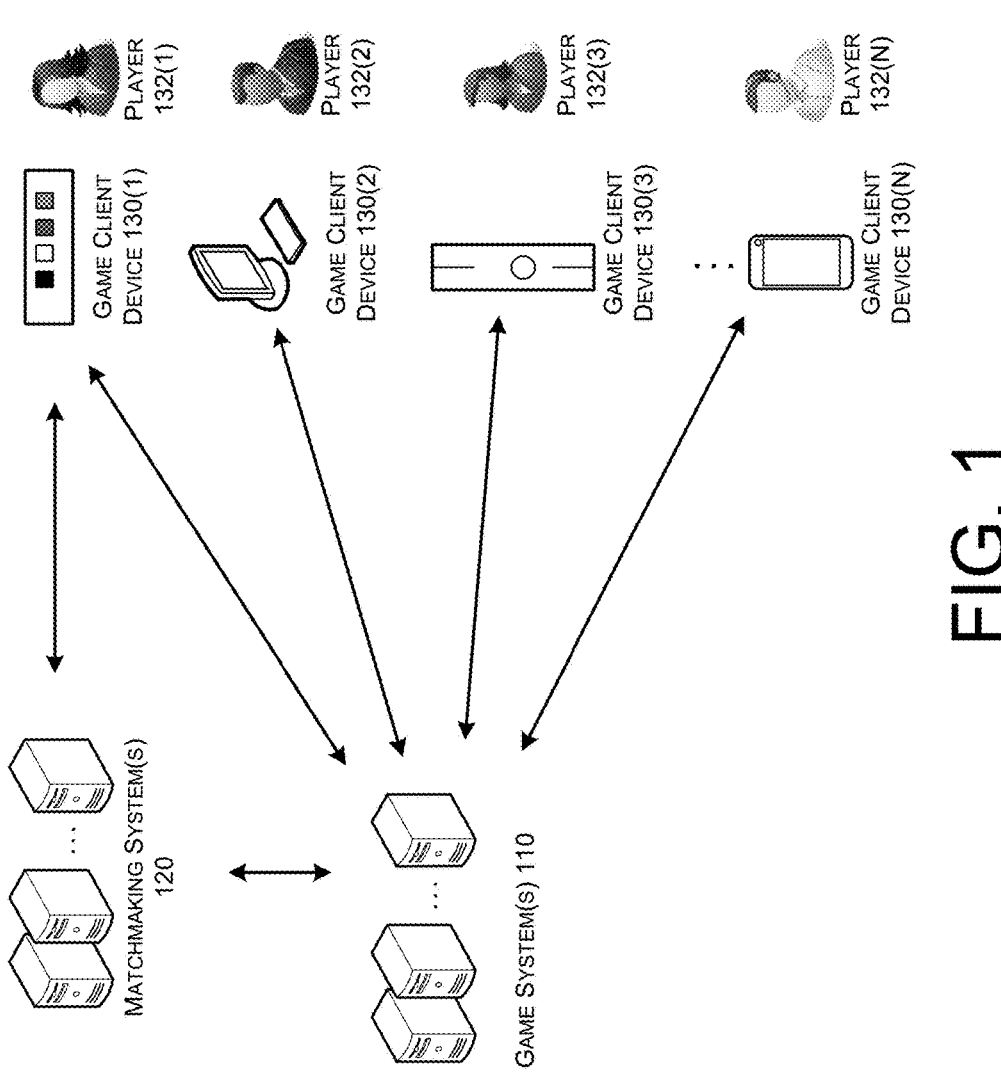
FIG. 1

500

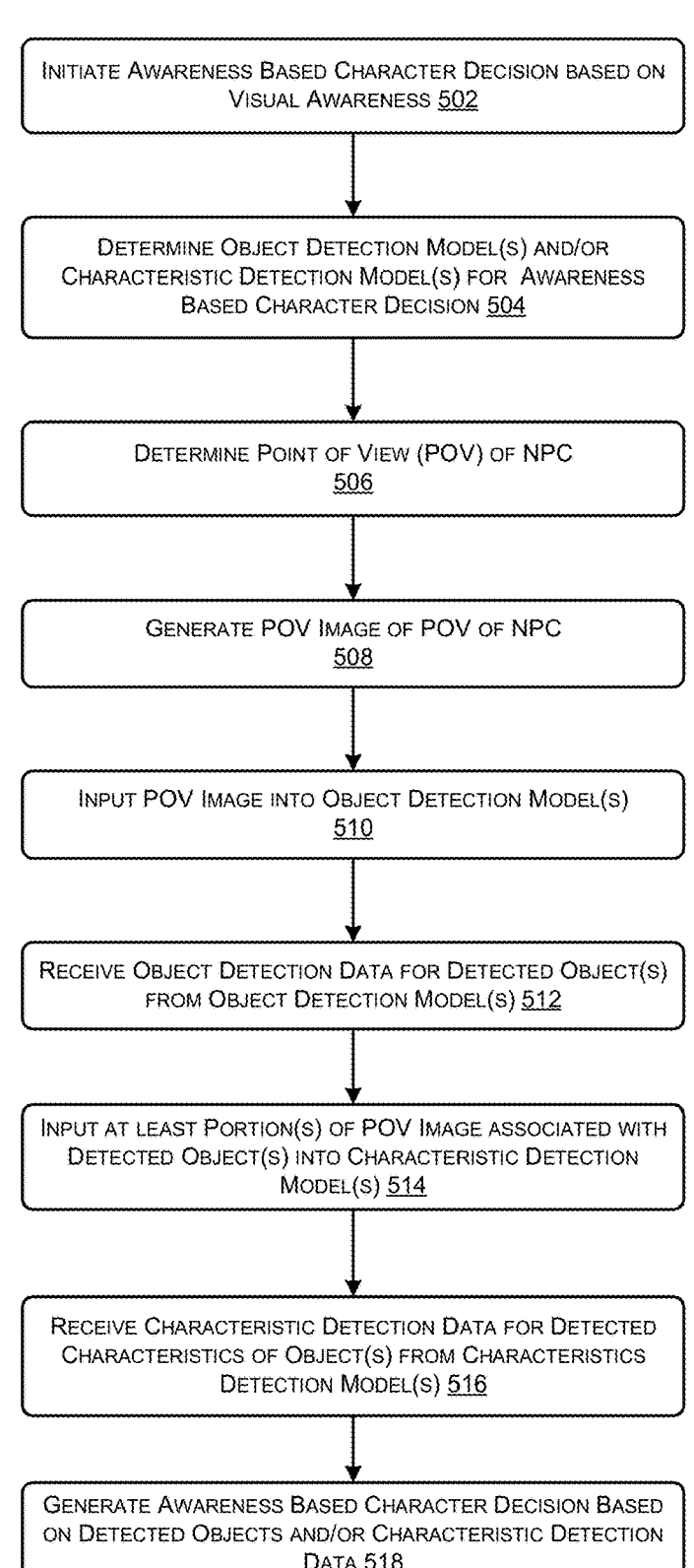

INITIATE AWARENESS BASED CHARACTER DECISION BASED ON VISUAL AWARENESS 502

DETERMINE OBJECT DETECTION MODEL(S) AND/OR CHARACTERISTIC DETECTION MODEL(S) FOR AWARENESS BASED CHARACTER DECISION 504

DETERMINE POINT OF VIEW (POV) OF NPC 506

GENERATE POV IMAGE OF POV OF NPC 508

INPUT POV IMAGE INTO OBJECT DETECTION MODEL(S) 510

RECEIVE OBJECT DETECTION DATA FOR DETECTED OBJECT(S) FROM OBJECT DETECTION MODEL(S) 512

INPUT AT LEAST PORTION(S) OF POV IMAGE ASSOCIATED WITH DETECTED OBJECT(S) INTO CHARACTERISTIC DETECTION MODEL(S) 514

RECEIVE CHARACTERISTIC DETECTION DATA FOR DETECTED CHARACTERISTICS OF OBJECT(S) FROM CHARACTERISTICS DETECTION MODEL(S) 516

GENERATE AWARENESS BASED CHARACTER DECISION BASED ON DETECTED OBJECTS AND/OR CHARACTERISTIC DETECTION DATA 518

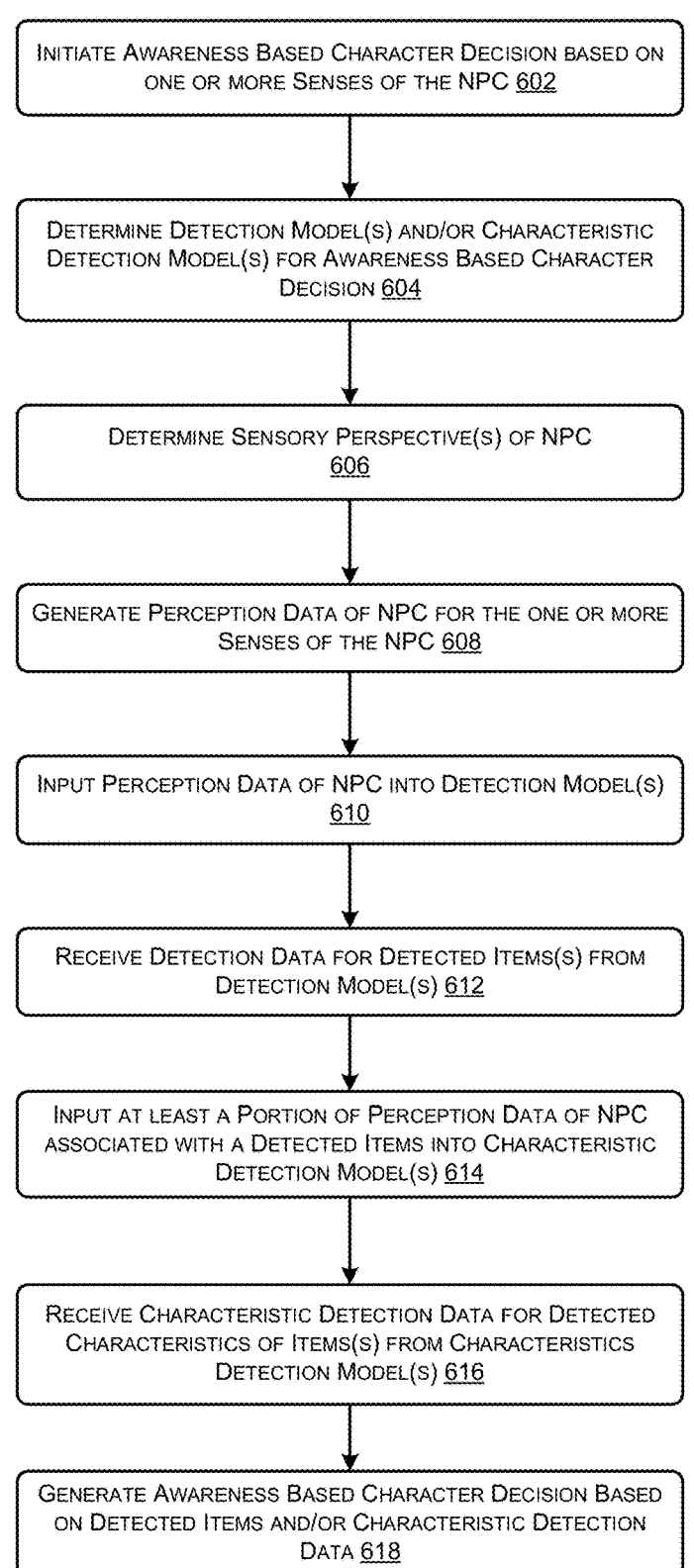

INITIATE AWARENESS BASED CHARACTER DECISION BASED ON ONE OR MORE SENSES OF THE NPC 602

DETERMINE DETECTION MODEL(S) AND/OR CHARACTERISTIC DETECTION MODEL(S) FOR AWARENESS BASED CHARACTER DECISION 604

DETERMINE SENSORY PERSPECTIVE(S) OF NPC 606

GENERATE PERCEPTION DATA OF NPC FOR THE ONE OR MORE SENSES OF THE NPC 608

INPUT PERCEPTION DATA OF NPC INTO DETECTION MODEL(S) 610

RECEIVE DETECTION DATA FOR DETECTED ITEMS(S) FROM DETECTION MODEL(S) 612

INPUT AT LEAST A PORTION OF PERCEPTION DATA OF NPC ASSOCIATED WITH A DETECTED ITEMS INTO CHARACTERISTIC DETECTION MODEL(S) 614

RECEIVE CHARACTERISTIC DETECTION DATA FOR DETECTED CHARACTERISTICS OF ITEMS(S) FROM CHARACTERISTICS DETECTION MODEL(S) 616

GENERATE AWARENESS BASED CHARACTER DECISION BASED ON DETECTED ITEMS AND/OR CHARACTERISTIC DETECTION DATA 618

FIG. 6

PROCESSOR(S) 600

NETWORK INTERFACE(S) 604

INPUT/OUTPUT INTERFACE(S) 602

STORAGE INTERFACE(S) 606

COMPUTER-READABLE MEDIA 608

GAME ENGINE 610

AWARENESS BASED DECISION MODULE 612

OBJECT DETECTION MODULE 614

CHARACTERISTIC DETECTION MODULE 616

DETECTION MODEL STORE 618

GAME SYSTEM(S)(S) 110

AWARENESS-BASED NON-PLAYER CHARACTER DECISION TECHNIQUES

BACKGROUND

Video gaming allows for players to play a variety of electronic and/or video games against or with AI driven non-player characters (NPCs). Online gaming may further allow for players to play with each other or against each other via network connectivity, such as via the Internet, in conjunction with game play with or against NPCs. In gaming, frustration may arise from NPC behavior which is unreasonable in the context of the game. For example, NPC behavior based on knowledge of the game environment state of which a human player would or could not be aware may cause player immersion to be broken and/or player frustration.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 illustrates a schematic diagram of an example environment with gaming system(s) that may provide for awareness-based NPC decision making, in accordance with example embodiments of the disclosure.

FIG. 5 illustrates a flow diagram of an example method that may provide for visual awareness-based NPC decision making, in accordance with example embodiments of the disclosure.

FIG. 6 illustrates a flow diagram of an example method that may provide for awareness-based NPC decision making, in accordance with example embodiments of the disclosure.

DETAILED DESCRIPTION

Figure 2A:
FIGS. 2A-2C illustrate views of an example virtual environment in which awareness-based NPC decision making may be performed during game play, in accordance with example embodiments of the disclosure.

Example embodiments of this disclosure describe methods, apparatuses, computer-readable media, and system(s) for providing awareness-based non-player character (NPC) decision making. More particularly, example methods, apparatuses, computer-readable media, and system(s) according to this disclosure may provide for NPC decision making based on information about the environment the NPC would be able to sense using one or more senses of, for example, the avatar of the NPC. For example, example methods, apparatuses, computer-readable media, and system(s) according to this disclosure may provide for an NPC whose avatar includes eyes to make decisions based on visual data of a field of view of the eyes of the NPC in a game environment.

Further, the awareness-based NPC decision making technique according to this disclosure may be performed during game play, as a NPC's in-game avatar moves through the virtual environment and/or changes are made to the environment's geometry and/or characteristics. For example, the awareness-based NPC decision making techniques according to this disclosure may allow for NPC's decision-making to take into account the awareness of the NPC of the presence of items in a new environment (e.g., objects in the environment, features of the environment, etc.). More particularly, the awareness-based NPC decision making techniques may allow an NPC to react to (or make predictions from) what it can sense or is otherwise aware of among the game environment, which may result in gameplay decisions and actions of the NPC appearing more natural to players.

In some examples, during gameplay, a system may be operating a game simulation in which inputs are received from one or more player to control one or more player controllable entities, the system may perform operations to control one or more non-player characters or entities (hereinafter NPC), and the system may output the state of the entities and environment for presentation to the players. In some examples, during gameplay, the system may determine the awareness of an NPC and then determine one or more controls for the NPC based on the determined awareness. In some examples, the controls for the NPC may be determined programmatically, by a machine learning model or another artificial intelligence process.

For example, in a first person shooter (FPS) game, when an NPC enters a room, the system may determine an awareness of the NPC to determine the controls for the NPC. In a particular example, a player character may be present in the room. The awareness determination by the system may or may not detect the player character. If the player character is detected, the awareness determination by the system may further determine what characteristics of the player character the NPC may be aware of. In a first scenario, from the point of view (POV) of the NPC, the player character may be behind cover (e.g., a bush or room divider) or not in the NPC's line of sight (LOS). The awareness determination may not detect the NPC if the NPC is out of the NPC's LOS or sufficiently obscured by the cover so as to not be detected. For example, the player character may be behind cover in dark area with part of the player character's foot visible from the POV of the NPC. In such a case, the awareness determination may not detect the visible portion of the player character. As such, the awareness-based decision-making process for controlling the NPC may not take into account the presence of the player character when determining the controls for the NPC. In a second scenario, the player character may be in the NPC's line of sight and/or a sufficient portion of the player character may be visible from the POV of the NPC. In such a case, the awareness determination may detect the visible portion of the player character. The awareness determination may then further determine what characteristics of the player character the NPC may be aware of. For example, if a head portion of the player character is visible and the direction of the head corresponds to the player's own POV, the awareness determination may determine whether the NPC would be aware of the direction the player is looking. In another example, the awareness determination may determine whether a weapon of the player character is visible and/or whether the NPC would be aware of the direction the weapon is pointed. As such, the awareness-based decision-making process for controlling the NPC may take into account the presence of the player character and the determined characteristics for the player (e.g., POV of the player character, whether the player character has a weapon, the direction the weapon is pointed, etc.) when determining the controls for the NPC.

While the examples discussed herein relate to determining the visual awareness of NPCs to determine controls thereof, this is merely for ease of explanation in illustration and not intended as a limitation. Other examples may utilize other senses such as tactile sensation, sound, taste, or smell, alone or in combination, in determining controls for NPC(s). In a particular example, the awareness determination may determine and then mix sounds that would be audible to the NPC at its location in the game environment. The awareness determination may then input the mixed sounds into a machine learned model which may have been trained to detect various sounds of the player character (e.g., the sound of the player character reloading, breathing, footsteps, etc.). In another example, the awareness determination may include a tactile sense that may detect vibration or position shift in environmental surfaces that would be caused by the player character. In a particular example, a player character may jump down onto a floor and then run across the room. The floor may be a second floor surface with a property indicating the floor is subject to minor but perceptible flexing in response to impacts or downward force from heavy weights and indicating the floor can transmit vibrations from running footsteps. In such an example, the awareness determination may determine a vibration force or position shift at the player character landing location and/or at the locations of the player character's footsteps. The awareness determination may then determine an amount of attenuation the sensation would be subject to over the distance to the location of the NPC (e.g., due to distance and/or simulated materials the vibration or position shift is transmitted through). The awareness determination may then mix the sensations from the player character's movement as felt at the NPC location with other vibrations or sensations in the environment. The awareness determination may then input the mixed tactile sensation data into a machine learned model which may have been trained to detect movement of player characters based on tactile sensation to determine whether the NPC is able to sense the player character based on the player character's movement causing vibration or position shift of surfaces in the environment.

The awareness-based NPC decision making technique described herein can improve a functioning of a computing device by providing for improved efficiency in controlling NPCs. For example, the awareness-based NPC decision making technique described herein may reduce a number of test cases that the system controlling the NPC may execute in determining controls for the NPC. Further, the techniques described herein may provide for actions of NPCs that appear more natural without requiring programmatic configurations. Further, the techniques described herein may reduce the amount of scripting or training for NPCs in highly dynamic scenarios, enabling developers to focus on the broader gameplay actions. These and other improvements to the functioning of the computer are discussed herein.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some examples provided herein relate to sport, fighting or shooting games. Implementations are not limited to the example genres. It will be appreciated that the disclosure encompasses variations of the embodiments, as described herein. Like numbers refer to like elements throughout.

FIG. 1 illustrates a schematic diagram of an example environment 100 with game system(s) 110, matchmaking system(s) 120, and game client device(s) 130 that may provide for awareness-based NPC decision making, in accordance with example embodiments of the disclosure.

The example environment 100 may include one or more player(s) 132(1), 132(2), 132(3), . . . 132(N), hereinafter referred to individually or collectively as player(s) 132, who may interact with respective game client device(s) 130(1), 130(2), 130(3), . . . 130(N), hereinafter referred to individually or collectively as game client device(s) 130 via respective input device(s). It should be understood that, as used herein, a player can refer to (i) a person playing or participating in a video game; (ii) systems or devices corresponding to, associated with, operated by and/or managed by a player; and/or (iii) accounts and/or other data or collections of data associated with or corresponding to a player.

The game client device(s) 130 may receive game state information from the one or more game system(s) 110 that may host the online game played by the player(s) 132 of environment 100. The game state information may be received repeatedly and/or continuously and/or as events of the online game transpire. The game state information may be based at least in part on the interactions that each of the player(s) 132 have in response to events of the online game hosted by the game system(s) 110.

The game client device(s) 130 may be configured to render content associated with the online game to respective player(s) 132 based at least on the game state information. More particularly, the game client device(s) 130 may use the most recent game state information to render current events of the online game as content. This content may include video, audio, haptic, combinations thereof, or the like content components.

As events transpire in the online game, the game system(s) 110 may update game state information and send that game state information to the game client device(s) 130. For example, if the player(s) 132 are playing an online soccer game, and the player 132 playing one of the goalies moves in a particular direction, then that movement and/or goalie location may be represented in the game state information that may be sent to each of the game client device(s) 130 for rendering the event of the goalie moving in the particular direction. In this way, the content of the online game is repeatedly updated throughout game play. Further, the game state information sent to individual game client device(s) 130 may be a subset or derivative of the full game state maintained at the game system(s) 110. For example, in a team deathmatch game, the game state information provided to a game client device 130 of a player may be a subset or derivative of the full game state generated based on the location of the player in the game simulation.

When the game client device(s) 130 receive the game state information from the game system(s) 110, a game client device 130 may render updated content associated with the online game to its respective player 132. This updated content may embody events that may have transpired since the previous state of the game (e.g., the movement of the goalie).

The game client device(s) 130 may accept input from respective player(s) 132 via respective input device(s). The input from the player(s) 132 may be responsive to events in the online game. For example, in an online basketball game, if a player 132 sees an event in the rendered content, such as an opposing team's guard blocking the point, the player 132 may use his/her input device to try to shoot a three-pointer. The intended action by the player 132, as captured via his/her input device, may be received by the game client device 130 and sent to the game system(s) 110.

The game client device(s) 130 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 130 may execute programs thereon to interact with the game system(s) 110 and render game content based at least in part on game state information received from the game system(s) 110. Additionally, the game client device(s) 130 may send indications of player input to the game system(s) 110. Game state information and player input information may be shared between the game client device(s) 130 and the game system(s) 110 using any suitable mechanism, such as application program interfaces (APIs).

The game system(s) 110 may receive inputs from various player(s) 132 and update the state of the online game based thereon. As discussed in more detail herein, the game system(s) 110 may operate to determine actions for one or more NPCs or computer controlled players and include those actions in the update of the state of the online game. As the state of the online game is updated, the state may be sent to the game client device(s) 130 for rendering online game content to player(s) 132. In this way, the game system(s) 110 may host the online game.

The example environment 100 may further include matchmaking system(s) 120 to match player(s) 132 who wish to play the same game and/or game mode with each other and to provide a platform for communication between the player(s) 132 playing online games (e.g., the same game and/or different games). The matchmaking system(s) 120 may receive an indication from the game system(s) 110 of player(s) 132 who wish to play an online game.

The matchmaking system(s) 120 may attempt matchmaking between player(s) 132. The matchmaking system(s) 120 may access information about the player(s) 132 who wish to play a particular online game, such as from a player datastore. A user account for each of the player(s) 132 may associate various information about the respective player(s) 132 and may be stored in the player datastore and accessed by the matchmaking system(s) 120.

Player(s) 132 may be matched according to one or more metrics associated with the player(s) 132 such as skill at a particular game. In addition to or alternatively to skill scores, player(s) 132 may be matched on a variety of other factors. Some example matchmaking factors may be related to behavior in addition to skill and may include a player's playstyle.

Having matched the player(s) 132, the matchmaking system(s) 120 may instruct generation of instance(s) of the online game(s) for the match(es). More particularly, the matchmaking system(s) 120 may request the game system(s) 110 instantiate an online game between the matched player(s) 132. For example, the matchmaking system(s) 120 may provide connection information for the game client device(s) 130 to the game system(s) 110 for instantiation of an instance of the online game between the matched player(s) 132.

The game system(s) 110 and or game client device(s) 130 may further include an awareness-based NPC decision making functionality to provide for controlling an NPC based on information about the environment the NPC would be aware of through one or more senses of the NPC (e.g., through the eyes or ears of an avatar of the NPC). The following discussion relates to an example in which awareness-based NPC decision making functionality is performed for the visual awareness of NPCs by the game system(s) 110 and used to update the state of the online game that is provided to the game client device(s) 130. However, examples are not so limited. For example, other examples may include the game client device(s) 130 performing the awareness-based NPC decision making functionality and either providing the result or the controls for the NPC based thereon to the other game client device(s) and/or the game system(s) 110. Moreover, some examples of this disclosure may include local game play and other variations. Further, as mentioned above, examples are not limited to visual awareness and may include additional or alternative senses (e.g., hearing, smell, or touch).

In some examples, an awareness-based decision module of the game system(s) 110 may determine that one or more decisions in controlling an NPC are based on the awareness of the NPC of the e/0nvironment. In some examples, the awareness-based decision module of the game system(s) 110 may be or include the controlling artificial intelligence of the NPC or may be a stand alone module that provides awareness determinations for another module that determines the controls the NPC. The awareness-based decision module may determine object detection model(s) and/or characteristic detection model(s) for the awareness based character decision. Depending on the example, a set of object detection model(s) and/or characteristic detection model(s) may be used for awareness-based decisions for all NPCs or different sets of object detection model(s) and/or characteristic detection model(s) may be used for different NPCs, or all NPCs may have respective sets of object detection model(s) and/or characteristic detection model(s). In a particular example, different types of NPCs in a FPS game may have different object detection model(s) and/or characteristic detection model(s). In another example, in a sports video game, different NPCs may have different object detection model(s) and/or characteristic detection model(s) to model real life professional player(s) the NPC(s) are based on. These and other variations would be apparent to one of ordinary skill in the art based on this disclosure.

The awareness-based decision module may then determine a point of view (POV) of the NPC associated with the requested awareness based character decision. For example, the awareness-based decision module may determine a location, a direction and field-of-view angles (e.g., width and height angles) for the POV of the NPC. The awareness-based decision module may then generate a POV image of the POV of the NPC. The POV image may be separate from images presented to players. Depending on the example, the POV image may be generated as a full resolution image (e.g., what would be presented to players), as a lower resolution image (e.g., lower resolution than what would be presented to players), rendered using the in-game model(s), rendered using downscaled model(s), or so on.

The awareness-based decision module may then input the POV image into the object detection model(s). For example, an image recognition model may be used for the identification of game objects and characters. Depending on the example and the video game, different models may be used to detect different objects in the POV image or a single model may be used to detect objects of interest to the awareness-based decision. The awareness-based decision module may then receive object detection data for detected object(s) from the object detection model(s). For example, the object detection data may include bounding boxes around the detected object and/or information about what the object was detected.

The awareness-based decision module may then input the object detection data for the detected object(s) and at least a part of the POV image into one or more characteristic detection model(s). In some examples, the awareness-based decision module may input at least a portion of POV image associated with a particular detected object into a characteristic detection model related to the object and/or the viewing NPC (e.g., based on the object detection data of the object). In some examples, a image classifier model may be utilized on to determine characteristics of the detected object or character. Additionally, other state information, such as character role or object trajectory, can also detected for use in determining the actions of the NPC. For example, a characteristic detection model for a FPS video game may receive a portion of a POV image associated with an object detection of an enemy character (e.g., an enemy player character or an enemy NPC) along with any other data provided by the object detection model (e.g., bounding box location and size, portion of character detected, etc.). The awareness-based decision module may receive characteristic detection data for detected characteristics of the object from the characteristic detection model(s).

The awareness-based decision module may then generate an awareness based character decision based on the detected objects and/or characteristic detection data of one or more objects in the POV image. For example, if the awareness-based decision module determined the NPC is aware of an enemy player character in a newly entered room in a FPS and is looking at the NPC but not aiming at the NPC, the NPC may be controlled to move to cover or back out of the room to prevent the player from shooting at the NPC. If the awareness-based decision module does not receive a detection of the enemy player character from the detection module or the characteristics detection module does not detect the object corresponding to the player character as an enemy avatar, the NPC may be controlled to take actions without considering the player character or without treating the player character as an known enemy. Additionally or alternatively, the awareness-based decision module may provide the detected objects and/or characteristic detection data of one or more objects in the POV image to another module that may generate the awareness based character decision based thereon.

Variations would be apparent based on this disclosure. For example, in some examples, the awareness-based decision module may perform object detection and then perform some or all characteristic detection for the detected objects programmatically (e.g., mathematically or using underlying game state data) instead of through analysis of the POV image. In another example, the awareness-based decision module may perform object detection programmatically and then perform characteristic detection based on the POV image as discussed above. For example, the awareness-based decision module may determine if the NPC can "see" the object using underlying game state data and, if so, determine a bounding box in a POV image for the object.

The object detection data and POV image may then be input to the characteristic detection model(s) as discussed above.

Additionally or alternatively, the awareness-based decision module may utilize a field of view or sensory positions separate from an avatar in some examples. For example, in a game in which players are provided with a third person POV (e.g., an over the shoulder camera view), the awareness-based decision module may provide object detection and/or characteristic detection based on a POV image from the same third person POV to determine the awareness for an AI controlling an opposing computer player. The actions of the opposing computer player may then be determined based on the portions of the environment the opposing computer player would be aware of if the opposing computer player were a human player. Further, while examples herein utilize POV images rendered from a viewpoint of the NPC, in other examples, the viewpoint or camera utilized for the awareness based decision making may be another camera view in the game simulation (e.g. a nearest existing camera view) which may be used in place of the NPC viewpoint.

Further, in some examples, the awareness-based decision module may utilize the object detections as input to multiple characteristic detection model(s) for multiple awareness-based decisions. Moreover, the objects detections which are input to the individual characteristic detection model(s) may be a subset of detected objects which are pertinent to the particular characteristic detection model(s) or particular awareness-based decision.

The models discussed herein may include any models, techniques, and/or machine learned techniques. For example, in some instances, the models may be implemented as a neural network.

An exemplary neural network may be a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Additional details regarding gaming systems that may provide awareness-based NPC decision making including object detection and/or characteristic detection during game play are illustrated in FIGS. 2A-4 and discussed below.

Figure 2B:
Figure 2C:

FIGS. 2A-2C illustrate example view 200, 220, and 240 of a virtual environment in which awareness-based NPC decision making may be performed during game play, in accordance with example embodiments of the disclosure.

In FIG. 2A, an example view 200 is illustrated that shows the POV image 202 of a quarterback NPC in a virtual environment of a football video game. The POV image 202 includes a receiver character avatar 204, another receiver character avatar 206 and multiple other character avatars including character avatars 208 (A)-208 (D). At the point in game play illustrated in POV image 202, the controlling AI of the quarterback NPC may be determining whether the quarterback NPC will throw the ball to a receiver. Accordingly, an awareness-based NPC decision making process may be initiated.

As illustrated, the receiver NPCs 204 and 206 may be valid targets for throwing the ball. As such, the awareness-based decision module may input the POV image into object detection model(s) trained to detect the receiver NPCs 204 and 206. In some examples, the awareness-based decision module may utilize a combined object detection model trained to recognize the valid receiver avatars available to the quarterback NPC (e.g., the receivers on the quarterback NPC's team). Alternatively or additionally, the awareness-based decision module may utilize different object detection models for different NPC receivers (e.g., object detection models that are trained to the particular NPC receiver).

While not shown, other awareness-based decision(s) may be performed using the POV image 202. For example, the controlling AI of the quarterback NPC may also request an awareness-based decision regarding whether the quarterback NPC should decide to run. For example, an awareness-based decision module may determine whether or not the quarterback NPC would decide to run by executing object detection model(s) on the POV image to detect the lineman NPCs 208 (B) and 208 (D) and/or one or more other object detection models (e.g., a general football player detection model) to determine the presence of other football player avatars. The awareness-based decision module may then determine that the gap between the lineman NPCs 208 (B) and 208 (D) is desirable (e.g., wide enough) and that no other football player avatars (e.g., opponent avatars) obstruct the gap. One or more object detection models may be shared between the awareness-based decisions of whether to throw the ball or run, but other detection models may also be utilized that are not shared. For example, the detection of opponent avatars approaching the quarterback NPC may be utilized to make both decisions about whether to the throw the football or to run the football.

FIG. 2B illustrates an example view 220 of the POV image 202 of the quarterback NPC in the virtual environment of the football video game after an object detection model has been run to detect receiver NPC 204. As illustrated, the receiver NPC 204 has been detected and the object detection model has output object detection data for the receiver NPC 204 (e.g., the bounding box 222).

FIG. 2C illustrates an example view 240 of the POV image 202 of the quarterback NPC in the virtual environment of the football video game after a characteristic detection model has been run to detect characteristics of the receiver NPC 204. More particularly, a characteristic detection model has been run on the receiver 204 to determine whether the receiver NPC 204 is looking at the quarterback NPC. As illustrated, the head of the receiver NPC 240 has been determined to be within bounding box 242. The characteristic detection model may further determine that the receiver NPC is not looking at the quarterback NPC or that the quarterback NPC cannot tell that the receiver NPC looking at the quarterback NPC by detecting that the eyes of the receiver NPC 204 are not visible to the quarterback NPC, the helmet of the receiver NPC 204 is turned away from the quarterback NPC or the like.

Because the receiver NPC 204 is not looking at the quarterback NPC, the awareness-based decision module may determine to not throw the ball to the receiver NPC 204.

Figure 3A:
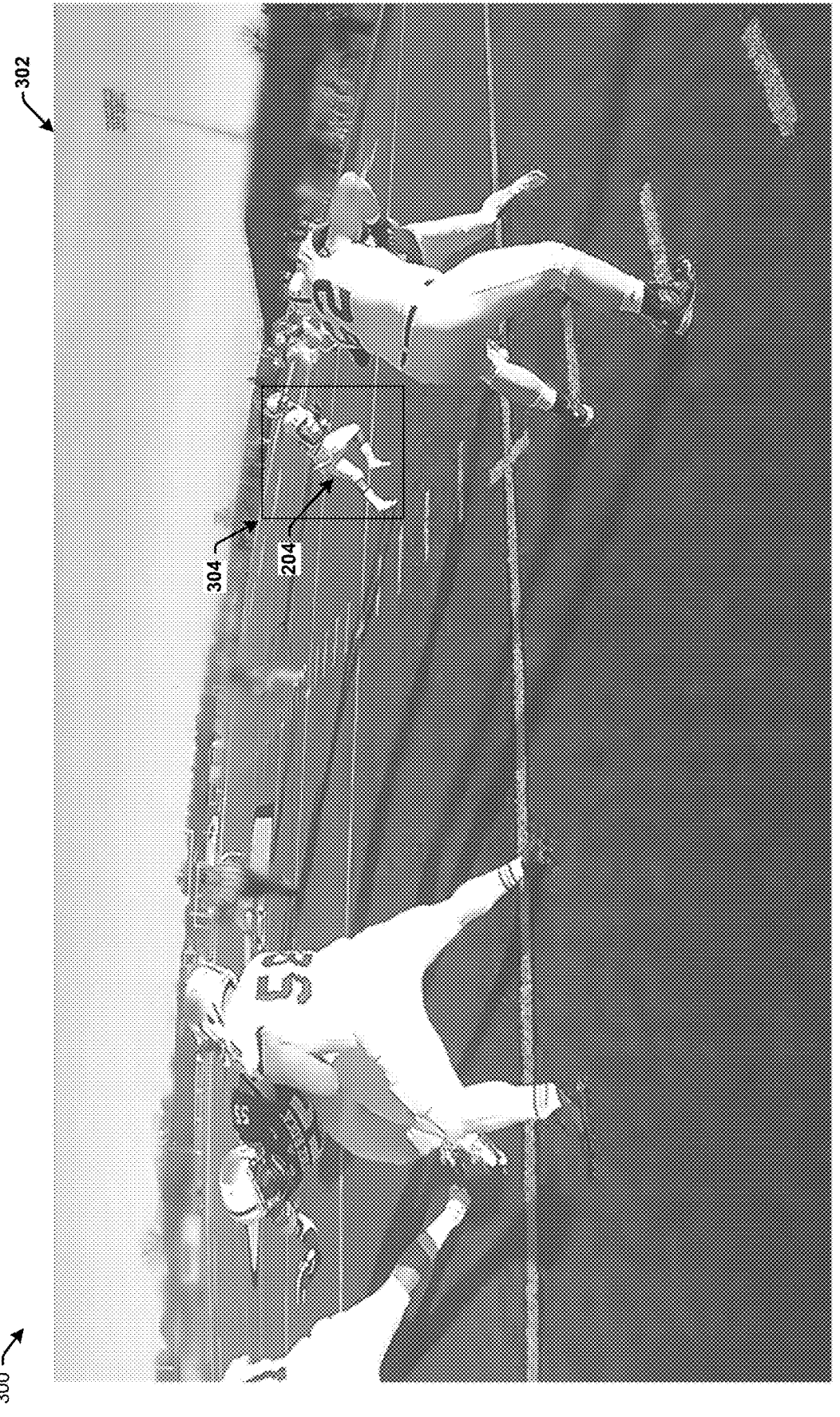
FIGS. 3A and 3B illustrate views of an example virtual environment in which awareness-based NPC decision making may be performed during game play, in accordance with example embodiments of the disclosure.
Figure 3B:
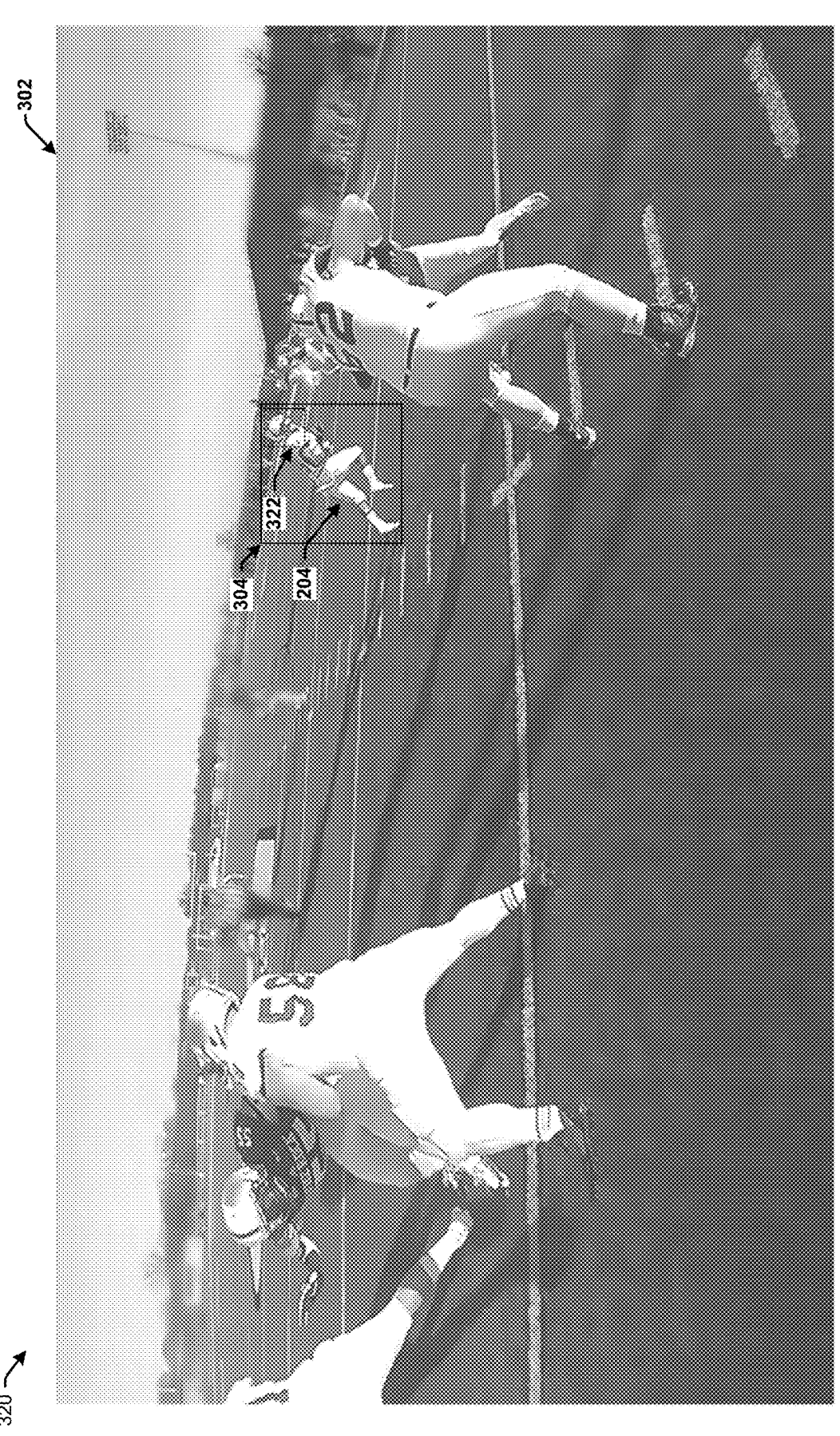

FIGS. 3A and 3B illustrate example views 300 and 320 of the virtual environment in which awareness-based NPC decision making may be performed during game play, in accordance with example embodiments of the disclosure. More particularly, example views 300 and 320 show a POV image 302 of the virtual environment from FIGS. 2A-2C a few seconds after the time at which POV image 202 was rendered.

As illustrated in FIG. 3A, the example view 300 of the POV image 302 includes the avatar of the receiver NPC 204 as well as other avatars. At the point in game play illustrated in POV image 302, the controlling AI of the quarterback NPC may again be determining whether the quarterback NPC will throw the ball to a receiver. Accordingly, the awareness-based NPC decision making process may be re-initiated.

As with POV image 202, the receiver NPC 204 may be a valid target for throwing the ball. As such, the awareness-based decision module may input the POV image 302 into the object detection model(s) trained to detect the receiver NPC 204. As illustrated, the receiver NPC 204 has been detected and the object detection model has output object detection data for the receiver NPC 204 (e.g., the bounding box 304).

As illustrated in FIG. 3B, the example view 320 shows the POV image 302 of the quarterback NPC in the virtual environment of the football video game after the characteristic detection model has been run to detect characteristics of the receiver NPC 204. More particularly, a characteristic detection model has been run on the receiver 204 in POV image 302 to determine whether the receiver NPC 204 is looking at the quarterback NPC. As illustrated, the head of the receiver NPC 204 has been determined to be within bounding box 322. The characteristic detection model may further determine that the receiver NPC is looking at the quarterback NPC by detecting that eyes of the receiver NPC 204 are visible to the quarterback NPC, the helmet of the receiver NPC 204 is turned toward the quarterback NPC or the like.

Because the receiver NPC 204 is looking at the quarterback NPC, the awareness-based decision module may determine to throw the ball to the receiver NPC 204. Of course, additional object detections or determinations may be included in addition to whether the receiver NPC is visible and looking at the quarterback NPC. For example, further object detections and/or characteristic detections may be performed to determine that no defenders are in position to interfere with a throw from the quarterback NPC to the receiver NPC 204.

Figure 4:
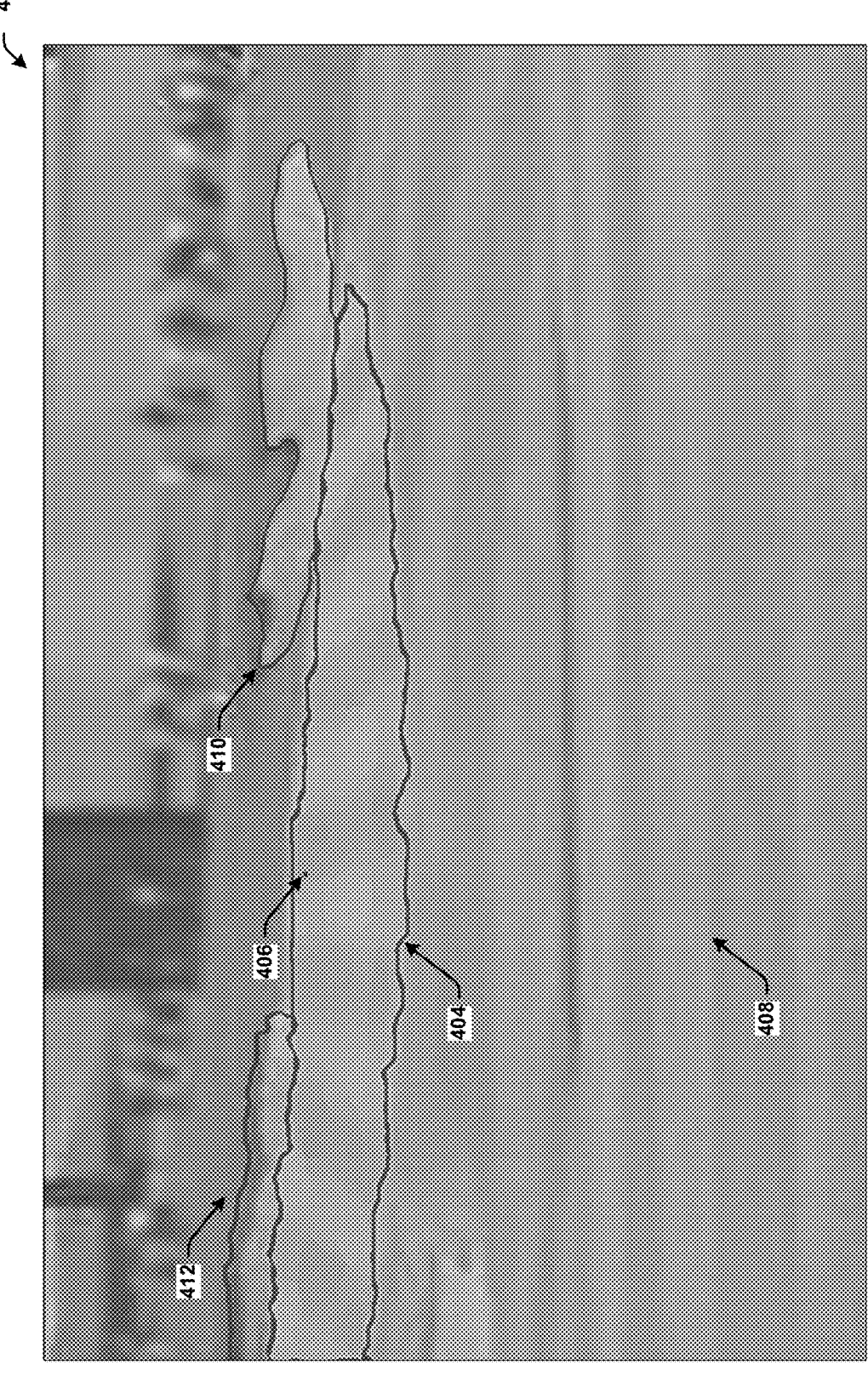
FIG. 4 illustrate a view of an example virtual environment in which awareness-based NPC decision making may be performed during game play, in accordance with example embodiments of the disclosure.

FIG. 4 illustrates an example view 400 of a virtual environment in which awareness-based NPC decision making may be performed during game play, in accordance with example embodiments of the disclosure. More particularly, FIG. 4 illustrates a different type of awareness-based NPC decision from that discussed above with regard to FIGS. 2A-3B. As illustrated in FIG. 4, the view 400 includes a POV image 402 of a golfer NPC. The POV image 402 may include a green 404 with the hole 406, a fairway 408 on which the golfer NPC is located, and two sand pits 410 and 412. The AI of the golfer NPC may initiate an awareness-based NPC decision regarding placement of the golfer NPC's next shot.

In the illustrated scenario, the awareness-based decision module may render a POV image or multiple POV images from the golfer NPC's location. For example, the golfer NPC's awareness of the golf course may not be limited to a point in time (e.g. a single POV image) as a golfer NPC may look around before taking a shot (e.g. multiple POV images). As discussed above, the awareness-based decision module may input the POV image(s) 402 into object detection model(s) to detect items 404-412 in the POV image(s) 402. The awareness-based NPC decision module may input object detection data regarding the detections of the items 404-412 into one or more characteristic detection model(s). The combination of object detection data and/or characteristic detection data which may identify that item 404 is the green with the hole 406, item 408 is the fairway on which the golfer NPC is located, and items 410 and 412 are hazards, specifically, two sand pits.

The awareness-based NPC decision module may determine an optimal shot placement to be a location short of the hole 406 because of the proximity of the two sand pits 410 and 412. In another scenario in which a hazard (e.g. water or a sand pit) is not visible in the POV image, the awareness-based NPC decision module may not take into account the hidden hazard. Due to not considering the hidden into account, the awareness-based NPC decision module may place the shot in a non-optimal location. As such, the player playing with or against the golfer NPC may feel the actions of the golfer NPC are more natural feeling.

Additionally or alternatively, the awareness-based NPC decision module may be utilized to reduce overhead in determining how to place the shot. In some conventional systems, the NPC control module may make a large number of test shots at a wide variety of angles and power. The NPC control module may then evaluate the resulting locations of the ball and choose a shot that resulted in the closest position to the hole without encountering hazards. A final shot may be determined using a random variance applied to the "best" shot parameters. Such shot placement determinations may result in the NPCs feeling unnatural because the NPCs may appear to be omniscient.

Some examples may reduce the number of test shots to be performed to determine a shot by filtering the possible test shots based on visible features of the environment. The filtered set of test shots may include shots that land in hidden hazards or fail to include optimal shots which are obscured or otherwise not visible from the point of view of the golfer NPC. In this way, the awareness-based decision-making techniques disclosed herein may reduce the processing involved in determining the shot placement and provide a more natural feel to the choices made by the NPC.

Variations would be apparent based on this disclosure. For example, different decisions by a particular NPCs, different NPCs, different genres of video games and other differences may utilize detection of various different objects and/or characteristics of those objects.

FIG. 5 illustrates a flow diagram of an example method 500 that may provide for awareness-based NPC decision making, in accordance with example embodiments of the disclosure. The method 500 may be performed by the devices of the environment 100. More particularly, the method 500 may relate to the operations of a game system(s) 110 or game client device(s) 130 and may be performed as discussed above.

In 502, an awareness-based decision module of the game system(s) 110 may initiate an awareness-based character decision for an NPC based on visual awareness of the NPC. For example, the awareness-based decision module may determine that one or more decisions in controlling an NPC are based on the awareness of the NPC of the environment. In some examples, the awareness-based decision module of the game system(s) 110 may be or include the controlling artificial intelligence of the NPC. Additionally or alternatively, the awareness-based decision module may be a standalone module that provides awareness determinations in response to a request from another module that determines the controls the NPC.

At 504, the awareness-based decision module may determine object detection model(s) and/or characteristic detection model(s) for the awareness-based character decision. Depending on the example, a set of object detection model(s) and/or characteristic detection model(s) may be used for awareness-based decisions for all NPCs or different sets of object detection model(s) and/or characteristic detection model(s) may be used for different NPCs, or all NPCs may have respective sets of object detection model(s) and/or characteristic detection model(s).

At 506, the awareness-based decision module may determine a point of view (POV) of the NPC associated with the awareness-based character decision. For example, the awareness-based decision module may determine a location, a direction and field-of-view angles (e.g., width and height angles) for the POV of the NPC.

At 508, the awareness-based decision module may generate a POV image of the POV of the NPC associated with the awareness-based character decision. The POV image may be separate from images presented to players. Depending on the example, the POV image may be generated as a full resolution image (e.g., what would be presented to players), as a lower resolution image (e.g., lower resolution than what would be presented to players), rendered using the in-game model(s), rendered using downscaled model(s), or so on.

At 510, the awareness-based decision module may then input the POV image into the object detection model(s). Depending on the example and the video game, different models may be used to detect different objects in the POV image or a single model may be used to detect objects of interest to the awareness-based decision. At 512, the awareness-based decision module may then receive object detection data for detected object(s) from the object detection model(s). For example, the object detection data may include bounding boxes around the detected object and/or information about what object was detected.

At 514, the awareness-based decision module may input the object detection data for the detected object(s) and at least part(s) of the POV image into one or more characteristic detection model(s). In some examples, the awareness-based decision module may input at least a portion of POV image associated with a particular detected object into a characteristic detection model related to the object and/or the viewing NPC (e.g., based on the object detection data of the object). For example, a characteristic detection model for a FPS video game may receive a portion of a POV image associated with an object detection of an enemy character (e.g., an enemy player character or an enemy NPC) along with any other data provided by the object detection model (e.g., bounding box location and size, portion of character detected, etc.). At 516, the awareness-based decision module may receive characteristic detection data for detected characteristics of the object from the characteristic detection model(s).

At 518, the awareness-based decision module then generate an awareness based character decision based on the detected objects and/or characteristic detection data of one or more objects in the POV image. Additionally or alternatively, the awareness-based decision module may provide the detected objects and/or characteristic detection data of one or more objects in the POV image to another module that may generate the awareness based character decision based thereon.

FIG. 6 illustrates a flow diagram of an example method 600 that may provide for awareness-based NPC decision making, in accordance with example embodiments of the disclosure. The method 600 may be performed by the devices of the environment 100. More particularly, the method 600 may relate to the operations of a game system(s) 110 or game client device(s) 130 and may be performed as discussed above. Further, the method 600 may relate to additional and/or alternative senses of NPCs (e.g. in addition to or instead of sight).

In 602, an awareness-based decision module of the game system(s) 110 may initiate an awareness-based character decision for an NPC based on one or more senses of the NPC. For example, the awareness-based decision module may determine that one or more decisions in controlling an NPC are based on the visual and auditory senses of the NPC of the environment. In some examples, the awareness-based decision module of the game system(s) 110 may be or include the controlling artificial intelligence of the NPC. Additionally or alternatively, the awareness-based decision module may be a standalone module that provides awareness determinations in response to a request from for another module that determines the controls the NPC.

At 604, the awareness-based decision module may determine detection model(s) and/or characteristic detection model(s) for the awareness based character decision. Depending on the example, a set of object detection model(s) and/or characteristic detection model(s) may be used for visual awareness and various auditory detection models may be used for sound awareness. Other variations such as those discussed above with regard to FIGS. 1-5 would also be apparent in view of this specification.

At 606, the awareness-based decision module may determine one or more sensory perspective(s) for one or more sense(s) of the NPC associated with the awareness-based character decision. A sensory perspective of a sense may refer to the location(s) and/or parameter(s) for generating perception data for the sense. For example, the awareness-based decision module may determine a visual point of view (POV) as the sensory perspective of a visual sense of the NPC. More particularly, the awareness-based decision module may determine a location, a direction and field-of-view angles (e.g., width and height angles) for the visual POV of the NPC. Similarly, the awareness-based decision module may a sensory perspective of an auditory sense of the NPC. For example, the awareness-based decision module may determine a location for and parameters of sound pickup and perception for the auditory awareness of the NPC (e.g., ability to isolate sounds from a mixture, frequency range, minimum volume for perception, etc.).

At 608, the awareness-based decision module may generate perception data of the NPC for the one or more senses of the NPC from the one or more sensory perspective(s) of the NPC. In some examples, the perception data may be data representative of what the sense of the NPC perceives or senses based on the environment and the sensory perspective of the sense, such as a POV image that represent what a visual sense of the NPC would perceive of the environment from the sensory perspective of the eyes of the NPC. In another example, various sounds may be generated based on the location of the ears of an NPC avatar (e.g., the auditory sensory perspective of the NPC) and mixed to simulate perception data for the auditory sense of the NPC. The perception data may be separate from perception data presented to players.

At 610, the awareness-based decision module may then input the perception data into the detection model(s). At 612, the awareness-based decision module may then receive detection data for detected items(s) from the detection model(s). For example, the detection data may include one or more objects and/or sounds that were recognized by the detection model(s) (e.g., data regarding the recognized items).

At 614, the awareness-based decision module may input the detection data for the detected items(s) and at least part(s) of the perception data into one or more characteristic detection model(s). In some examples, the awareness-based decision module may input at least a portion of a POV image associated with a particular detected object into a characteristic detection model related to the object and/or the viewing NPC (e.g., based on the object detection data of the object). In another example, the awareness-based decision module may input at least a portion of the simulated audio data into a characteristic detection model related to a sound the detection models recognized. For example, the sound of a footstep may be detected by a detection model. The portion of the audio including the footstep may be input to a characteristic detection model associated with determining the direction to the footstep and/or the other information such as whether the footstep was likely the produced by running or walking. At 616, the awareness-based decision module may receive characteristic detection data for detected characteristics of the item(s) from the characteristic detection model(s). Additional processing may be performed to integrate detections of items and characteristics across models and/or senses.

At 618, the awareness-based decision module may then generate an awareness-based character decision based on the detected items and/or characteristic detection data of one or more items in the perception data. Additionally or alternatively, the awareness-based decision module may provide the detected items and/or characteristic detection data of one or more items in the perception data to another module that may generate the awareness based character decision based thereon.

It should be noted that some of the operations of methods 500-600 may be performed out of the order presented, with additional elements, and/or without some elements. Some of the operations of methods 500-600 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 7:
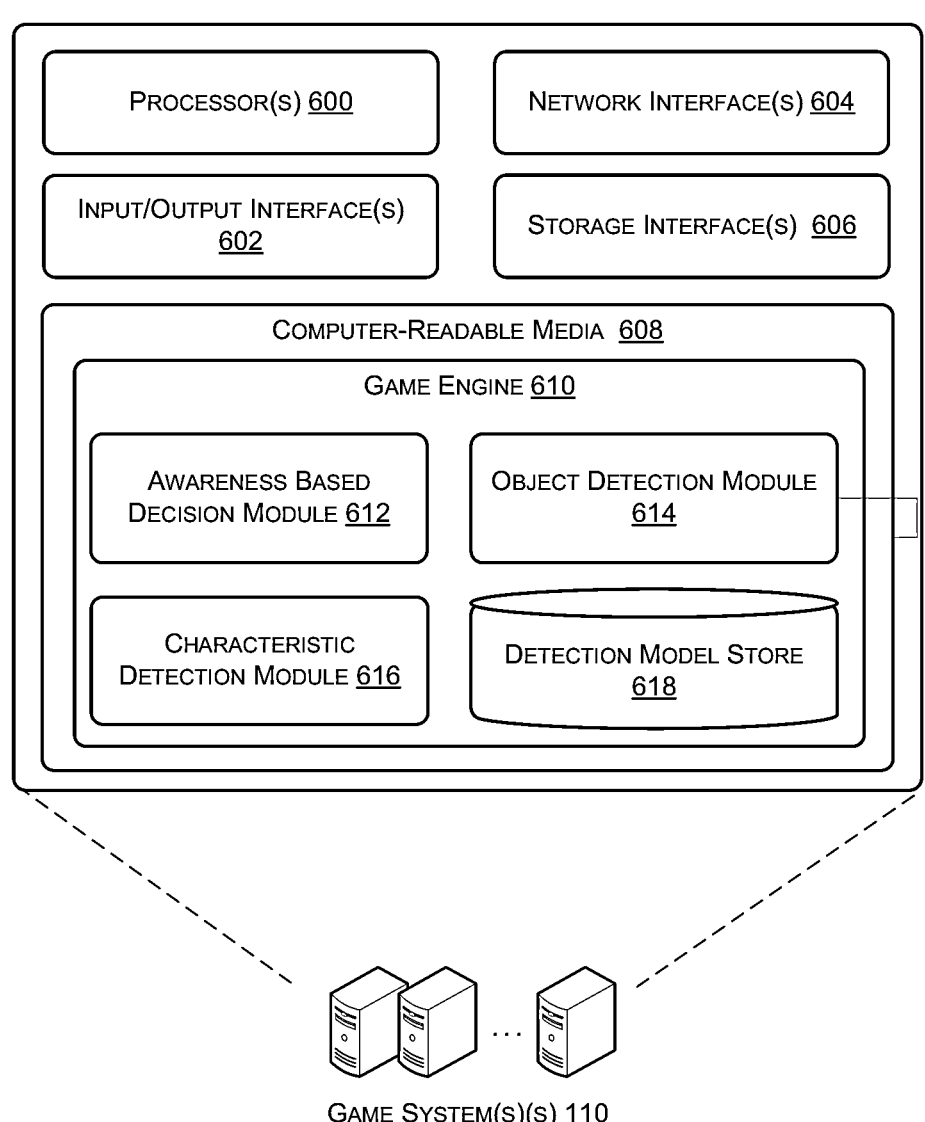
FIG. 7 illustrates a block diagram of example game system(s) that may provide for awareness-based NPC decision making, in accordance with example embodiments of the disclosure.

FIG. 7 illustrates a block diagram of example game system(s) 110 that may provide for awareness-based NPC decision making, in accordance with examples of the disclosure. The game system(s) 110 may include one or more processor(s) 700, one or more input/output (I/O) interface(s) 702, one or more network interface(s) 704, one or more storage interface(s) 706, and computer-readable media 708.

In some implementations, the processor(s) 700 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 700 may possess its own local memory, which also may store program modules, program data, and/or one or more operating system(s). The one or more processor(s) 700 may include one or more cores.

The one or more input/output (I/O) interface(s) 702 may enable the game system(s) 110 to detect interaction with a user and/or other system(s), such as one or more game client device(s) 130. The I/O interface(s) 702 may include a combination of hardware, software, and/or firmware and may include software drivers for enabling the operation of any variety of I/O device(s) integrated on the game system(s) 110 or with which the game system(s) 110 interact, such as displays, microphones, speakers, cameras, switches, and any other variety of sensors, or the like.

The network interface(s) 704 may enable the game system(s) 110 to communicate via the one or more network(s). The network interface(s) 704 may include a combination of hardware, software, and/or firmware and may include software drivers for enabling any variety of protocol-based communications, and any variety of wireline and/or wireless ports/antennas. For example, the network interface(s) 704 may comprise one or more of a cellular radio, a wireless (e.g., IEEE 802.1x-based) interface, a Bluetooth® interface, and the like. In some embodiments, the network interface(s) 704 may include radio frequency (RF) circuitry that allows the game system(s) 110 to transition between various standards. The network interface(s) 704 may further enable the game system(s) 110 to communicate over circuit-switch domains and/or packet-switch domains.

The storage interface(s) 706 may enable the processor(s) 700 to interface and exchange data with the computer-readable medium 708, as well as any storage device(s) external to the game system(s) 110.

The computer-readable media 708 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 708 may be implemented as computer-readable storage media (CRSM), which may be any available physical media accessible by the processor(s) 700 to execute instructions stored on the computer readable media 708. In one basic implementation, CRSM may include RAM and Flash memory. In other implementations, CRSM may include, but is not limited to, ROM, EEPROM, or any other tangible medium which can be used to store the desired information and which can be accessed by the processor(s) 700. The computer-readable media 708 may have an operating system (OS) and/or a variety of suitable applications stored thereon. The OS, when executed by the processor(s) 700 may enable management of hardware and/or software resources of the game system(s) 110.

Several functional blocks having instruction, data stores, and so forth may be stored within the computer-readable media 708 and configured to execute on the processor(s) 700. The computer readable media 708 may have stored thereon a game engine 710 that may include an awareness-based decision module 712, an object detection module 714, a characteristic detection module 716, and a detection model store 718. It will be appreciated that each of the functional blocks 710-716 may have instructions stored therein that, when executed by the processor(s) 700, may enable various functions pertaining to the operations of the game system(s) 110 discussed above. More particularly, the awareness-based decision module 712 may operate to determine one or more detection models to retrieve from the detection model store 718 for the awareness-based decision. The awareness-based decision module 712 may then operate to cause the object detection module 714 and characteristic detection module 716 to execute the models loaded from the detection model store 718 using inputs from the awareness-based decision module 712 as discussed above (e.g. POV image, sound mix, etc.). The awareness-based decision module 712 may then generate awareness-based character decision as discussed above.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to perform operations comprising:
determining a sensory perspective of a sense of a non-player character (NPC) in a virtual environment of a game simulation, wherein the sensory perspective comprises a point of view of the NPC that includes a location, a direction, and field-of-view angles for visual awareness of the NPC;
generating perception data of the NPC from the sensory perspective of the sense, wherein the perception data comprises a point-of-view image rendered from the sensory perspective that is separate from images presented to players;
inputting the perception data of the NPC into a detection model associated with the sense, wherein the detection model comprises a machine learning model trained to detect objects in the point-of-view image;
receiving, from the detection model, detection data for a detected item, wherein the detection data includes bounding boxes around the detected item and information identifying what the detected item is; and
generating an awareness-based character decision for the NPC based on the detection data of the detected item.

2. The system of claim 1, wherein the sense is sight, the sensory perspective is a viewpoint of the NPC and the perception data is an image of the virtual environment from the viewpoint of the NPC.

3. The system of claim 2, wherein determining the sensory perspective includes determining the location and the field-of-view angles of one or more eyes of an avatar of the NPC in the virtual environment and determining the image of the virtual environment from the viewpoint of the NPC based on the location and the field-of-view angles of the one or more eyes.

4. The system of claim 2, wherein the detection data indicates a location of the detected item in the image and an object type of the detected item.

5. The system of claim 2, the operations further comprising:
inputting at least a portion of the perception data associated with the detected item into a characteristic detection model; and
receiving characteristic detection data for a detected characteristic of the detected item from the characteristic detection model; and wherein generating the awareness-based character decision for the NPC is further based on the characteristic detection data of the detected item.

6. The system of claim 5, wherein the detected item is an avatar of another NPC or a player character and the characteristic detection data of the detected item indicates a direction of an aspect of the avatar.

7. The system of claim 5, wherein the detected item is an avatar of another NPC or a player character and the characteristic detection data of the detected item indicates a relationship between the NPC and the other NPC or the player character.

8. The system of claim 1, the operations further comprising:

determining at least one of the detection model or a characteristic detection model based on the awareness-based character decision for the NPC.

9. A computer-implemented method comprising:

determining a sensory perspective of a sense of a non-player character (NPC) in a virtual environment of a game simulation, wherein the sensory perspective comprises a point of view of the NPC that includes a location, a direction, and field-of-view angles for visual awareness of the NPC;

generating perception data of the NPC from the sensory perspective of the sense, wherein the perception data comprises a point-of-view image rendered from the sensory perspective that is separate from images presented to players;

inputting the perception data of the NPC into a detection model associated with the sense, wherein the detection model comprises a machine learning model trained to detect objects in the point-of-view image;

receiving, from the detection model, detection data for a detected item, wherein the detection data includes bounding boxes around the detected item and information identifying what the detected item is; and generating an awareness-based character decision for the NPC based on the detection data of the detected item.

10. The computer-implemented method of claim 9, wherein the sense is sight, the sensory perspective is a viewpoint of the NPC and the perception data is an image of the virtual environment from the viewpoint of the NPC.

11. The computer-implemented method of claim 10, wherein determining the sensory perspective includes determining the location and the field-of-view angles of one or more eyes of an avatar of the NPC in the virtual environment and determining the image of the virtual environment from the viewpoint of the NPC based on the location and the field-of-view angles of the one or more eyes.

12. The computer-implemented method of claim 10, wherein the detection data indicates a location of the detected item in the image and an object type of the detected item.

13. The computer-implemented method of claim 9, further comprising:

inputting at least a portion of the perception data associated with the detected item into a characteristic detection model; and receiving characteristic detection data for a detected characteristic of the detected item from the characteristic detection model; and wherein generating the awareness-based character decision for the NPC is further based on the characteristic detection data of the detected item.

14. The computer-implemented method of claim 13, wherein:

the detected item is an avatar of another NPC or a player character; and one or more of:

the characteristic detection data of the detected item indicates a direction of an aspect of the avatar; or the characteristic detection data of the detected item indicates a relationship between the NPC and the other NPC or the player character.

15. One or more computer-readable media storing computer-executable instructions that, when executed by one or more processors, cause the one or more processors to perform operations comprising:

determining a sensory perspective of a sense of a non-player character (NPC) in a virtual environment of a game simulation, wherein the sensory perspective comprises a point of view of the NPC that includes a location, a direction, and field-of-view angles for visual awareness of the NPC;

generating perception data of the NPC from the sensory perspective of the sense, wherein the perception data comprises a point-of-view image rendered from the sensory perspective that is separate from images presented to players;

inputting the perception data of the NPC into a detection model associated with the sense, wherein the detection model comprises a machine learning model trained to detect objects in the point-of-view image;

receiving, from the detection model, detection data for a detected item, wherein the detection data includes bounding boxes around the detected item and information identifying what the detected item is; and generating an awareness-based character decision for the NPC based on the detection data of the detected item.

16. The one or more computer-readable media of claim 15, wherein the sense is sight, the sensory perspective is a viewpoint of the NPC and the perception data is an image of the virtual environment from the viewpoint of the NPC.

17. The one or more computer-readable media of claim 16, wherein determining the sensory perspective includes determining location and the field-of-view angles of one or more eyes of an avatar of the NPC in the virtual environment and determining the image of the virtual environment from the viewpoint of the NPC based on the location and the field-of-view angles of the one or more eyes.

18. The one or more computer-readable media of claim 15, the operations further comprising:

inputting at least a portion of the perception data associated with the detected item into a characteristic detection model; and receiving characteristic detection data for a detected characteristic of the detected item from the characteristic detection model; and wherein generating the awareness-based character decision for the NPC is further based on the characteristic detection data of the detected item.

19. The one or more computer-readable media of claim 18, wherein:

the detected item is an avatar of another NPC or a player character; and one or more of:

the characteristic detection data of the detected item indicates a direction of an aspect of the avatar; or the characteristic detection data of the detected item indicates a relationship between the NPC and the other NPC or the player character.

20. The one or more computer-readable media of claim 18, the operations further comprising:

determining at least one of the detection model or the characteristic detection model based on the awareness-based character decision for the NPC.

* * * * *